UNITED STATES PATENT OFFICE.

WILLIAM A. BALDWIN, OF CHICAGO, ILLINOIS, ASSIGNOR OF ONE-FOURTH TO AMMI A. THOMAS, J. CLEMENT SMITH, AND JAMES J. SHEEHY, ALL OF WASHINGTON, DISTRICT OF COLUMBIA.

TREATMENT OF METALS.

SPECIFICATION forming part of Letters Patent No. 379,438, dated March 13, 1888.

Application filed April 14, 1887. Serial No. 234,821. (No specimens.)

*To all whom it may concern:*

Be it known that I, WILLIAM AUGUSTUS BALDWIN, a citizen of the United States, residing at Chicago, in the county of Cook and State of Illinois, have invented certain new and useful Improvements in the Treatment of Metals; and I do declare the following to be a full, clear, and exact description of the invention, such as will enable others skilled in the art to which it appertains to make and use the same.

This invention relates to the treatment of iron and other metals; and it consists in the novel treatment hereinafter described, for the purpose of imparting strength, compactness, flexibility, and securing them agntasi rusting and corrosion, as hereinafter described.

In carrying out my invention I first take a quantity of clay, or other substance containing alumina, and grind it to a fine powder. I next take pulverized charcoal and common salt, and place the three in a suitable fusing-pot, in about the following proportions, namely: clay, one part; charcoal, one fourth part; and salt, three parts, by weight. The proportions above stated may be varied to suit the exigencies of the case; but as a rule the above will be found very nearly correct. I next fuse the contents of the pot thoroughly, and then am ready to commence the treatment of metals.

The treatment consists in immersing the metal in the fused materials and keeping it there until the required amount of aluminum has become absorbed in and incorporated therein, as hereinafter set forth.

Strips of American sheet-iron of stove-pipe thickness are immersed in the fused contents of the pot, and allowed to remain about five minutes and then withdrawn. When partially but not entirely cooled, I insert such strips again, and repeat the process a third time, and then allow them to cool slowly.

Sheet-iron of the same kind as stove-pipe iron, but of twice its thickness, is treated in the manner above mentioned by repeated baths, occupying about seven minutes each.

Sheets or bars of iron of about one-fourth of an inch in thickness are charged with aluminum in about twenty minutes by repeated baths in the manner above specified.

In using my process great attention must be given to the thickness of the metal treated, as the number of baths and the time required for treatment depend largely upon the thickness of such metal.

I sometimes find it desirable to increase the amount of charcoal in the pot beyond the proportions above mentioned, in order to impart an additional amount of carbon to the metal. This, however, is only required in cases where the metal itself is deficient in carbon.

Copper is treated in the same manner as iron, and the result is practically the same.

I find by my experiments that it is desirable to heat the metal for treatment before immersion in the pot; but this is not indispensable.

Iron thus charged by immersion in the fused contents of the pot is found to possess great tensile strength, compactness, and durability. It is also capable of receiving a brilliant polish by any of the well-known methods of burnishing. It is furthermore adapted to the manufacture of cutlery in all its departments, as it seems to possess all the qualities of steel.

In my pending applications, Nos. 234,818, 234,819, and 234,820, I have described the fused bath of clay and the like, carbonaceous matter, and sodium chloride that is set forth in the present application; but in neither of said applications have I made claim to the process herein described and claimed.

I claim as my invention—

The process of treating metals which consists in immersing such metals without fusion in a fused bath of clay or other like earthy substances bearing alumina, carbonaceous matter, and sodium chloride, the latter being in excess of either of the other substances, substantially as specified.

In testimony whereof I affix my signature in presence of two witnesses.

WILLIAM A. BALDWIN.

Witnesses:
THEO. MUNGEN,
JAMES J. SHEEHY.